United States Patent [19]
Neri et al.

[11] 3,927,204
[45] Dec. 16, 1975

[54] USE OF $\alpha,\beta$-POLY-(ASPARTIC ACID)-HYDROXYALKYLAMIDES AS A PLASMA EXPANDER

[75] Inventors: Paolo Neri; Guido Antoni; Franco Benvenuti, all of Siena, Italy

[73] Assignee: Instituto Sieroterapico e Vaccinogeno Toscano "Sclavo" S.p.A., Siena, Italy

[22] Filed: Aug. 21, 1974

[21] Appl. No.: 499,580

Related U.S. Application Data

[63] Continuation-in-part of Ser. No. 51,771, July 2, 1970.

[30] Foreign Application Priority Data

July 3, 1969  Italy ........................... 4667/69

[52] U.S. Cl. ............. 424/78; 260/78 A; 260/112.5; 424/101; 424/177
[51] Int. Cl.[2] .................. A61K 31/74; A61K 35/14; A61K 37/00
[58] Field of Search ......... 260/78 A, 112.5; 424/78, 424/101, 177

[56] References Cited
OTHER PUBLICATIONS

J. of Medicinal Chemistry, 10, 1967, Kovacs et al., pp. 904–908.
J. of Organic Chemistry, 26, 1961, Kovacs et al., pp. 1084–1091.
Advances in Protein Chemistry, Vol. XIII, 1958, Anfinsen et al., pp. 419–426.

Primary Examiner—Stanley J. Friedman
Attorney, Agent, or Firm—Haseltine, Lake & Waters

[57] ABSTRACT

A method for the treatment of a patient with a diminished plasma volume level caused by microcirculatory impairment due to septic or traumatic shock comprising administrating a therapeutically effective plasma expanding dose of a hydroxyalkylamide of $\alpha, \beta$-polyaspartic acid having the formula

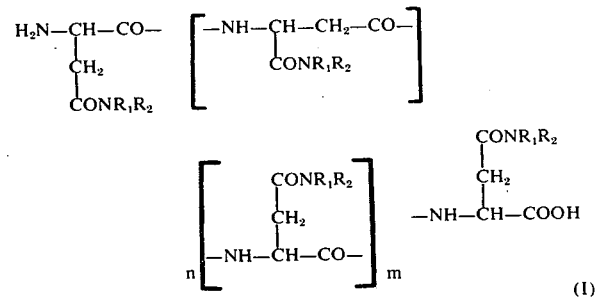

wherein: $R_1$ is hydrogen, an alkyl group, or a hydroxyalkyl group; $R_2$ is a hydroxyalkyl group; n is the number of beta-linked residues; m is the number of alpha-linked residues, and the sum of $n + m$ is within the range of 100 to 300 (calculated from viscosity measurements in DMF according to Doty's curve, J. Am. Chem. Soc. 78, 947, 1956) or from 75 to 550 (calculated from ultracentrifuge measurements).

5 Claims, 1 Drawing Figure

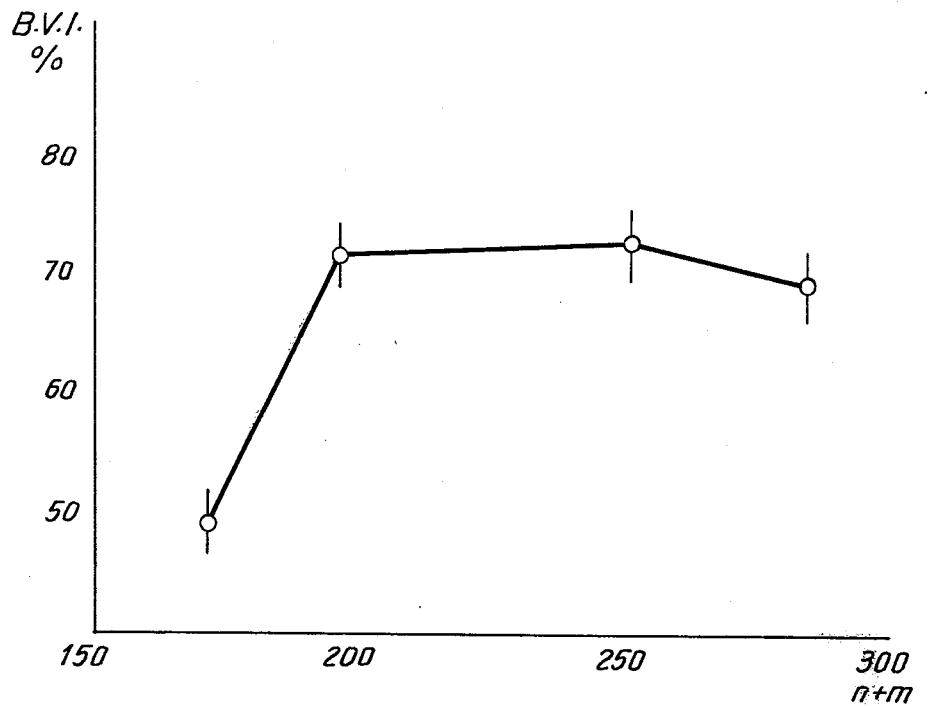
*Determination of the bleeding volume index (B.V.I.)*
Animal used in experiment: male cat
Bleeding: 2 ml/kg/3 minutes
Speed of I.V. infusion of 3% solution
in saline: 2 ml/kg/minute

USE OF $\alpha,\beta$-POLY-(ASPARTIC ACID)-HYDROXYALKYLAMIDES AS A PLASMA EXPANDER

CROSS RELATED APPLICATION

This application is a continuation-in-part of copending application Ser. No. 51,771, filed July 2, 1970.

FIELD OF THE INVENTION

This invention relates to polymers, and in particular to hydroxyalkylamides suitable as plasma expanders and useful in protecting mammals from shock.

BRIEF DESCRIPTION OF THE DRAWING

The sole FIGURE of the drawing is a graphical representation of the relation of bleeding volume index with respect to the degree of polymerization of the compound of the invention.

SUMMARY OF THE INVENTION $\alpha,\beta$-Poly-(aspartic acid) hydroxyalkylamides of the present invention are embraced by the following formula (I):

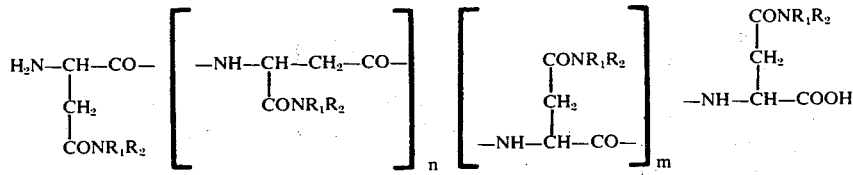

(I)

wherein: $R_1$ is hydrogen, or an alkyl group, or a hydroxyalkyl group; $R_2$ is a hydroxyalkyl group; $n$ is the number of $\beta$-linked residues, and $m$ is the number of $\alpha$-linked residues. The sum of $n + m$ (polymerization degree of polymer) was calculated either from viscosity measurements in N,N-dimethylformamide according to Doty's curve (J. Am. Chem. Soc. 78, 947, 1956) or from ultracentrifuge measurements. $n + m$ lies within the range of 100 to 300 (from Doty's curve); 75 to 550 (from ultracentrifuge measurements). Compounds of formula I wherein the volue of $n + m$ lies within the range of 200 to 250 (from Doty's curve); 250 to 400 (from ultracentrifuge measurements) are of particular value. Compounds of formula I include the D, L and DL isomeric forms. The compounds of formula I are synthesized by the reaction of anhydropolyaspartic acid (formula II) of suitable degree of polymerization, $x$, with approximately an equal amount of the appropriate aminoalcohol; the degree of polymerization of the anhydropolyaspartic acid must be greater than that of the desired polyhydroxyalkylamide, because partial degradation takes place during the reaction.

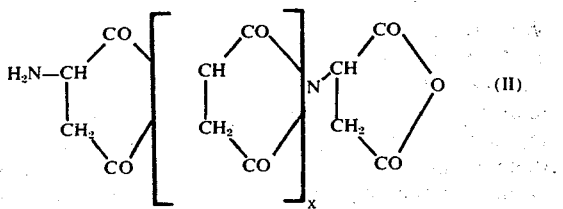

These polymers (formula (I) are easily dissolved in water and are without electrical charge; the choice of suitable substitutes permits one to obtain products without, or with low toxicity.

Toxicological experiments carried out on various species of animals (mouse, rat, rabbit, cat) have show that products with $n + m$ from 100 to 300 (from Doty's curve); 75 to 550 (from ultracentrifuge measurements) are without acute or chronic toxicity. Also they are not antigenic.

From a pharmacological point of view, polymers of $n + m$ varying from 200 to 250 (from Doty's curve); 250 to 400 (from ultracentrifuge measurements) have shown greater efficacy in tests for protection against haemorrhagic shock in animals, though preparations of $n + m$ from 150 to 300 (from Doty's curve); 150 to 550 (from ultracentrifuge measurements) have shown some efficacy. Both plasma volume and bleeding volume index (B.V.I.) have been determined.

The results of this last test carried out with $\alpha,\beta$-poly-DL-aspartic hydroxyethylamide, for different degrees of polymerization are shown in the graph in the attached drawing. In this graph the value of $n + m$ is shown on the abscissa and the value of B.V.I. on the ordinate. The test for the determination of the bleeding volume index was carried out in the male cat by bleeding 2 ml/kg/ 3 minutes and with a rate of intravenous (I.V.) infusion of 3% solution in saline of 2 ml/kg/minute.

The 3% solution of $\alpha,\beta$-poly-DL-aspartic hydroxyethylamide has been compared with the 6% Dextran solution that is normally commercially available. From this comparison, it results that the solution of $\alpha,\beta$-poly-DL-aspartic hydroxyethylamide does not alter the parameter of haemagglutination, as happens with Dextran solutions; the increase in erythrocyte sedimentation rate (E.S.R.) caused by the new product is notably less than that caused by Dextran; Dextran solution shows some antigenicity. With regard to efficacy, the two products proved equal.

Therefore, the hydroxyalkylamides of $\alpha,\beta$-polyaspartic acid can be usefully used as plasma expanders, at concentrations of 3–4% in saline or salt-added solutions. For a more detailed qualitative and quantitative composition, see Examples 7 and 8 hereafter.

DESCRIPTION OF PREFERRED EMBODIMENTS

Preferred embodiments of the invention will hereafter be discussed in greater detail with reference to the following specific examples.

EXAMPLE 1

Preparation of the formula I wherein:
$R_1 = -H$;
$R_2 = -CH_2CH_2OH$ 30 g of anhydropolyaspartic acid were dissolved in 150 ml of dimethylformamide, and 30 ml of ethanolamine were added to the solution while stirring and keeping the reaction mixture at a temperature of 25°–30°C. After about 1 hr, the polymer obtained was precipitated by the addition of about 500 ml of chloroform.

The upper liquid solution was eliminated as much as possible by decantation and the residual semi-solid mass was again treated with chloroform to further purify it from the ethanolamine.

The product was then dissolved in diluted HCl, and the solution neutralized with dilute NaOH and dialyzed against running water for 72 hrs and against distilled water for 48 hrs. It was then concentrated and lyophylized.

Yield: about 38 g.; Analysis: for $(C_6H_{10}N_2O_3)_n$; % calculated: C 45.57; H 6.37; N 17.71; O 30.35; % found: C 45.45; H 6.30; N 17.72; O 30.40.

It was calculated that the degree of polymerization of this polymer is about 200(Doty's curve); 250 (ultracentrifuge). The oncotic efficacy per gram of polymer in comparison with Bovine Serum Albumin is about 2.3.

EXAMPLE 2

Preparation of the product of formula I wherein:
$R_1 = -H$;
$R_2 = -CH_2-CH_2OH$
$n + m = 220$ (Doty's curve);
300 (ultracentrifuge) (average values).

30 g of anhydropolyaspartic acid were dissolved in 150 ml of dimethylformamide, and 30 ml of ethanolamine were added to the solution while stirring, and the reaction mixture kept at a temperature of 25°–30°C. After about 1 hr, 10 g of acetic acid were added, during continual stirring for 10 min. at room temperature, and the solution was concentrated under vacuum. The residue was taken up with water, dialyzed for 72 hrs against running water and for 48 hrs against distilled water, and lyophylized.

Yield: about 42 g.; Analysis: for $(C_6H_{10}N_2O_3)_n$; % calculated: N 17.71; % found: N 17.67.

EXAMPLE 3

Preparation of the product of formula I wherein:
$R_1 = -H$;
$R_2 = -CH_2CH_2CH_2OH$
$n + m = 200$ (Doty's curve).
250 (ultracentrifuge) (average values).

The procedure was identical to that of Example No. 1 but with the substitution of propanolamine for ethanolamine.

Yield: about 42 g.; Analysis: for $(C_7H_{12}N_2O_3)_n$; % calculated: N 16.27; % found: N 16.18.

EXAMPLE 4

Preparation of the product of formula I wherein:
$R_1 = -H$;
$R_2 = -CH_2CH(OH)CH_3$
$n + m = 200$ (Doty's curve).
250 (ultracentrifuge) (average values).

The procedure was identical to that of Example No. 1 but with the substitution of isopropanolamine for ethanolamine.

Yield: about 40 g.; Analysis: for $(C_7H_{12}N_2O_3)_n$; % calculated: N 16.27; % found: N 16.27.

EXAMPLE 5

Preparation of the product of formula I wherein:
$R_1 = -CH_3$;
$R_2 = -CH_2CH_2OH$
$n + m = 200$ (Doty's curve).
250 (ultracentrifuge) (average values). 5 g of anhydropolyaspartic acid were dissolved in 25 ml of dimethylformamide; then 50 ml of 2-methylaminoethanol were added without cooling. A large precipitate formed immediately, which redissolved during the procedure of raction. After ½ hour, the solution obtained was treated with acetone and a pasty mass was obtained, then washed with acetone, and thereafter treated as in Example No. 3.

Yield: about 5 g.; Analysis: for $(C_7H_{12}N_2O_3)_n$; % calculated: N 16.27; % found: N 15.91.

EXAMPLE 6

Preparation of the product of formula I wherein:
$R_1 = R_2 = -CH_2-CH_2-OH$
$n + m = 200$ (Doty's curve);
250 (ultracentrifuge) (average values).

50 g of anhydropolyaspartic acid were dissolved in 25 ml of dimethylformamide, 50 g of diethanolamine were added and the reaction mixture was kept at a temperature of 50°C for 1½ hours, with occasional stirring. When the reaction mixture was cool, chloroform was added as precipitant, and the pasty mass obtained, having been washed with chloroform, was treated as in Example No. 3.

Yield: about 7 g.; Analysis: for $(C_8H_{14}N_2O_4)_n$; % calculated: N 13.85; % found: N 13.80.

EXAMPLE 7

Infusional solution for intravenous administration, characterized by the following composition per cent:

| | |
|---|---|
| α,β-poly-DL-aspartic hydroxyethylamides | 3 g |
| Sodium Chloride | 0.83 g |
| Potassium Chloride | 0.04 g |
| Calcium Chloride | 0.065 g |
| Sterile apyrogenic distilled water | as required to 100 ml |

The solution is prepared in bottles of 250–500–1000 ml. Indications: hypovolaemic shock due to haemorrhage of various types, such as trauma, sepsis, poisoning, burns.

EXAMPLE 8

Infusional solution for intravenous administration, characterized by the following composition per cent:

| | |
|---|---|
| α,β-polyaspartic hydroxyalkylamides | 2.5 – 4.5 g |
| Sodium chloride | 0.83 – 0.85 g |
| Potassium chloride | 0.035 – 0.04 g |
| Calcium chloride | 0.06 – 0.08 g |
| Sterile apyrogenic distilled water | as required to 100 ml. |

The solution is prepared in bottles of 250–500–1000 ml. Indications: hypovolaemic shock due to haemorrhage of various types such as trauma, sepsis, poisoning, burns.

What is claimed is:

1. A method for the treatment of a patient with a diminished plasma volume level and microcirculatory impairment due to septic or traumatic shock, said method comprising intravenously administrating to the patient a therapeutically effective plasma expanding dose of a compound of a hydroxyalkylamide of α,β-polyaspartic acid having the formula

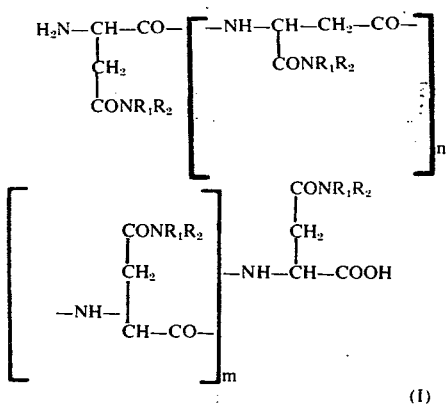

wherein: $R_1$ is hydrogen, an alkyl group, or a hydroxyalkyl group; $R_2$ is a hydroxyalkyl group; $n$ is the number of beta-linked residues; $m$ is the number of alpha-linked residues, and the sum of $n + m$ is within the range of 100 to 300 (calculated from viscosity measurements in DMF according to Doty's curve, J. Am. Chem. Soc. 78, 947, 1956) or from 75 to 550 (calculated from ultracentrifuge measurements).

2. A method as claimed in claim 1 wherein said compound is the hydroxyethylamide of $\alpha,\beta$-poly-DL-aspartic acid.

3. A method as claimed in claim 1 wherein said compound is in association with a pharmaceutical carrier therefor.

4. A method as claimed in claim 3 wherein said compound is present in an amount of 3–4% in said solution.

5. A method as claimed in claim 4 wherein said solution is a saline solution.

* * * * *